(12) United States Patent
He

(10) Patent No.: US 6,957,001 B2
(45) Date of Patent: Oct. 18, 2005

(54) COLOR-CHANGING AND MULTI-COLORED ELECTROLUMINESCENT CABLE

(76) Inventor: Wenzheng He, No. 1706 High Technology Building, No. 229 North Si Huan Zhong Road, Beijing (CN), 100083

( * ) Notice: Subject to any disclaimer, the term of this patent is extended or adjusted under 35 U.S.C. 154(b) by 25 days.

(21) Appl. No.: 10/769,306

(22) Filed: Jan. 29, 2004

(65) Prior Publication Data

US 2004/0247262 A1 Dec. 9, 2004

(30) Foreign Application Priority Data

Jan. 29, 2003 (CN) .................................... 03236894 U
Aug. 13, 2003 (CN) ............................ PCT/CN03/00662

(51) Int. Cl.⁷ .............................. G02B 6/44; H01J 1/62; H01J 63/04
(52) U.S. Cl. ....................... 385/104; 385/102; 385/103; 385/101; 385/100; 313/483; 313/494; 313/484; 313/486; 313/487
(58) Field of Search ................................ 385/100–113; 313/483, 485–487, 491, 493–494, 496, 502–504, 506, 511–512, 489; 362/551, 554–556, 559

(56) References Cited

U.S. PATENT DOCUMENTS 5,485,355 A * 1/1996 Voskoboinik et al. ......... 362/84
5,869,930 A * 2/1999 Baumberg et al. .......... 313/506
6,143,434 A * 11/2000 Okada ........................ 428/690
6,329,083 B1 * 12/2001 Toguchi et al. ............. 428/690

FOREIGN PATENT DOCUMENTS

| CN | 1182343 | * | 5/1998 | ........... H05B/33/12 |
| CN | 1350416 | * | 5/2002 | ........... H05B/33/00 |
| CN | 2523165 | * | 11/2002 | ........... H05B/33/12 |
| JP | 07-235375 | * | 9/1995 | ........... H05B/33/00 |

* cited by examiner

*Primary Examiner*—Frank G. Font
*Assistant Examiner*—Ryan Lepisto

(57) ABSTRACT

The present invention relates to an electroluminescent light source. In particular, it relates to an multi-colored electroluminescent cable capable of changing colors, which comprises: a group of electroluminescent filaments which consist of a plurality of electroluminescent filaments of different colors and are insulated from each other, helically wound on the outer side of the axis; a transparent and flexible polymer casing tube disposed on the outer side of the group of electroluminescent filaments. The advantage of the present invention is low in power consumption, simple in structure, convenient for use, and has relatively long service life. The filament can be bent into a plurality of geometrical shapes as consumers demand, and it is beautiful and appealing. Besides, being extraordinarily extensive in its scope of application, the present invention can be used for external and internal housing and automobile decoration, and for external decoration for the purpose of advertisement, in entertainment places, and for toys, art and handicraft products and electric and electronic equipment.

21 Claims, 3 Drawing Sheets

COLOR-CHANGING AND MULTI-COLORED ELECTROLUMINESCENT CABLE

TECHNICAL FIELD

The present invention relates to an electroluminescent light source. In particular, it relates to a multi-colored electroluminescent cable capable of changing colors.

BACKGROUND

The conventional cable-like light emitting device mainly comprises: Neo light, with fragile glass outer layer, dangerous factors of high voltage and high frequency and incapability of being readily shaped, has the drawbacks of high power consumption and high cost for manufacture and maintenance. Further, it cannot change colors.

The colored incandescent light using filament to emit incandescent light and colored tube to achieve colored light effect consists of a plurality of small incandescent bulb or light emitting diode(LED); This kind of color tube is of substantial diameter and its diameter of lattice light filament is 10 mm or more, and it is power-consuming, with its freedom of shaping being restricted by the large diameter and rigidity.

Moreover, the further drawbacks of said two devices lie in low efficiency in light emission, proneness to conductive wire damage and likelihood to cause fatal accidents when used in rainy weather.

Still another electroluminescent light source also has its deficiency. For example, the technical solution disclosed in the Patent No. CN1101125C and U.S. Pat. No. 5,869,930 relates to a mono-color light source using solvent to dilute the substance of electrolytic layers, making it loosely organized and producing a lot of blowholes and pores, which should be filled in with transparent substance for continuous light emission. The process is complex, and because transparent filler does not have a long, effective conductivity such that this kind of light source is apt to lose its function, the light emission can not last long, nor can the light be emitted evenly.

SUMMARY OF THE INVENTION

The objects of the present invention is to provide an electroluminescent cable, low in electricity consumption, convenient to use and capable of changing colors of the light with the changing of inputted information.

The technical solution of the present invention is:

A color-changing and multi-colored electroluminescent cable, comprising:
  a core wire made of soft metal or polymer as the central axis;
  a group of electroluminescent filaments consisting of a plurality of electroluminescent filaments of different colors which are insulated from each other and helically wound on the outer side of the central axis;
  a transparent and flexible polymer casing tube disposed on an outer side of the group of electroluminescent filaments to form a flexible light emitting cable; wherein the diameter of said central axis is 0.5–10 mm.

A color-changing and multi-colored electroluminescent cable without axis, comprising:
  a group of electroluminescent filaments consisting of a plurality of electroluminescent filaments of different colors which are insulated from each other and helically wrung together in the same direction;
  a transparent and flexible polymer casing tube disposed on an outer side of the group of electroluminescent filaments to form a flexible light emitting cable; wherein each filament of the group of electroluminescent filaments is connect with the programmable electronic elements respectively, and said programmable electronic elements control each electroluminescent filament respectively to emit light according to the predetermined program.

After AC power supply having a voltage ranging from 50 to 300 V and frequency ranging from 200 to 10000 HZ is input, under the control of programmable electronic elements, an electric field is generated between the electrodes of electroluminescent filament. When the filaments are activated, the light of different colors will emit. So the electroluminescent cable becomes beautiful and colorful. Furthermore, the color, saturation, luminance and other aspects are controllable. Through the control of the programmable electronic elements, each filament of the cable will emit light in sequence such that the light-emitting cable can be formed with changeable colors and brightness.

Said group of electroluminescent filaments consists of at least 2 to 8 electroluminescent filaments.

The diameter of said each electroluminescent filament is 0.5–3 mm.

The diameter of said flexible light emitting cable is 2–20 mm.

Said electroluminescent filament, comprising:
  a metal conductive wire as core wire and one of electrodes;
  a medium insulating layer, which is made of the insulating mixture with the improved density, coated on the core wire;
  a light emitting layer, which is made of the light-emitting mixture with the improved density, coated on the medium insulating layer;
  a conductive layer which is made of the conductive mixture, coated on the light emitting layer;
  one or more transmission conductive wires wound at interval on the conductive layer and led out as the other electrode;
  a color polymer casing tube disposed on the transmission conductive wires and an outer surface of conductive layer; where:

Said core wire, a metal wire of a diameter 0.1–1 mm, is led out as an electrode.

The color of said polymer casing tube disposed on the outmost layer of the cable is selected as customers demand and the casing tube has the function of protecting the cable.

The diameter of the color polymer casing tube is 0.5–3 mm.

Said transmission conductive wires have one or more metal conductive wires that are highly conductive, specially treated and not easy to break; said metal conductive wires winds, at interval, round the outer side of the conductive layer and are led out as the other electrode. Said transmission conductive wires may have a diameter in the range of 0.04 and 0.12 mm.

Said medium insulating layer is a mixture coat of flexible binder having cyanoethyl as its base and $BaTiO_3$ powder, with a preferred thickness of 25–60 $\mu m$.

Said light-emitting layer is a mixture coat of flexible binder having cyanoethyl as its base and light emitting phosphorus powder, with a preferred thickness of 25–60 $\mu m$.

Said conductive layer is a highly conductive semi-solid viscous conductive substance.

Preferably, it is a semi-transparent, semi-solid viscous conductive polymer containing Au and methyl methacrylate. Preferably, it has a thickness of 0.05 mm or less.

The preferred thickness of said three coats of the present invention is the result of a lot of experiments made by the present inventor, and has overcome the drawbacks of the electroluminescent filament of the prior art. The present inventor has concluded from much experimentation that where the input power supply is of an equivalent parameter, the thickness of the medium insulating layer and light emitting layer has a direct effect on the light emission and bend resistance of the light-emitting filament. If the thickness exceeds 60 $\mu$m, the light emitted by the light-emitting filament will be dimmer. More importantly, when the light-emitting filament bends, the internal organization, under the impact of the internal bending force, is broken after being increasingly compressed along with the decreasing of the diameter of the bending, which would result in short circuit of the light-emitting filament or break the medium insulating player and the light emitting layer, thus disabling the light emission or causing partial non-light-emission of the light emitting filament.

DETAILED DESCRIPTION OF THE PREFERRED EMBODIMENTS

The present invention will now be further described in connection with the illustrative figures of the description and embodiments so that it may be more fully understood.

Figure 1:
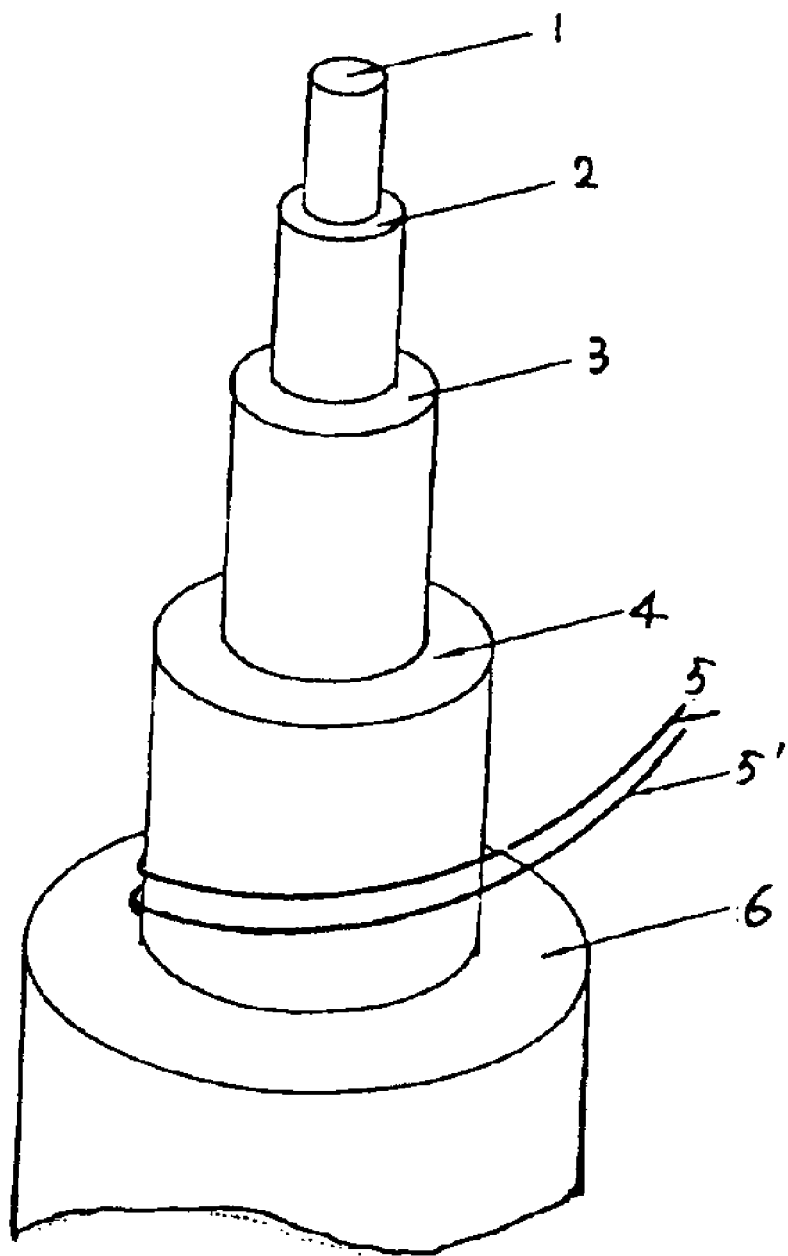
FIG. 1 is a schematic diagram illustrating the structure of the individual electroluminescent filament of the present invention.

As illustrated in FIG. 1, a multi-colored electroluminescent filament 8, mainly comprising:

a metal conductive wire as core wire 1;

a medium insulating layer 2 coated on the core wire 1;

a light emitting layer 3 coated on the medium insulating layer 2;

a conductive layer 4 coated on the light emitting layer 3;

two transmission conductive wires 5, 5' wound at interval on the conductive layer 4;

a color polymer casing tube 6 disposed on the transmission conductive wires 5, 5' and an outer surface of conductive layer 4;

wherein core wire 1, a metal wire of a diameter 0.5 mm, is led out as an electrode.

Said medium insulating layer 2 is a mixture coat of flexible binder having cyanoethyl as its base and BaTiO3 powder, with a preferred thickness of 0.035 mm.

Said light-emitting layer 3 is a mixture coat of flexible binder having cyanoethyl as its base and light emitting phosphorus powder, with a preferred thickness of 0.035 mm.

Said conductive layer 4 is a semi-transparent, semi-solid viscous conductive polymer containing Au and methyl methacrylate, with a preferred thickness of 0.05 mm or less.

Said transmission conductive wires 5, 5' are two metal conductive wires having a diameter of 0.06 mm that are highly conductive, specially treated and not easy to break; the two metal wires wind, at interval, round the outer side of the conductive layer 4 and are led out as the other electrode.

The color of said polymer casing tube 6 disposed on the outmost layer of the cable is selected according to the customers demand and the casing tube has the function of protecting the cable. It also works as a protective layer to protect transmission conductive wire 5, 5' from being broken.

Figure 2:
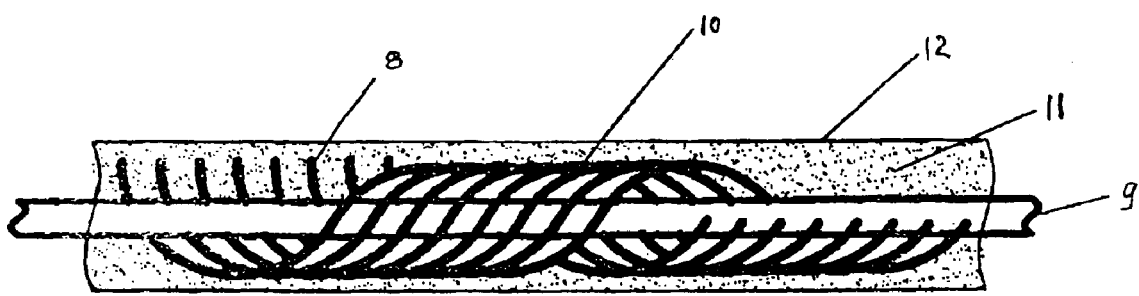
FIG. 2 is a schematic diagram illustrating the structure of the electroluminescent cable according to a first embodiment the present invention.
Figure 3:
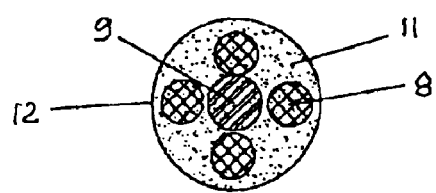
FIG. 3 is a cross-section view illustrating the structure of the electroluminescent cable according to a first embodiment the present invention.

Embodiment 1:

As shown in FIGS. 2 and 3, a color-changing and multi-colored electroluminescent cable 12, comprising:

a core wire made of Aluminum as a central axis 9;

a group of electroluminescent filaments 10 consisting of a plurality of electroluminescent filaments 8 of different colors which are insulated from each other and helically wound on the outer side of the axis 9;

a transparent polymer casing tube 11 disposed on the outer side of the group of electroluminescent filaments 10 to form a flexible light emitting cable 12.

Wherein the diameter of the central axis 9 is 0.5–10 mm.

Wherein each electroluminescent filament 8 of the group of electroluminescent filaments 10 is connect with the programmable electronic elements (not shown in the figures) respectively, and the programmable electronic elements control each electroluminescent filament 8 respectively to emit light according to a predetermined program.

After AC power supply having a voltage ranging from 50 to 300 V and frequency ranging from 200 to 10000 HZ is input, under the control of programmable electronic elements, an electric field is generated between the electrodes of electroluminescent filaments. When the filaments are activated, the light of different colors will emit. So the electroluminescent cable becomes beautiful and colorful. Furthermore, the color, saturation, luminance and other aspects are controllable. Through the control of the programmable electronic elements, each filament of the cable will emit light in sequence such that the light-emitting cable with changeable colors and brightness can be formed.

Said group of electroluminescent filaments 10 consists of at least 2 to 8 electroluminescent filaments 8.

The diameter of said each electroluminescent filament 8 is 0.5–3 mm.

The diameter of said flexible electroluminescent cable 12 is 2–20 mm.

Figure 4:
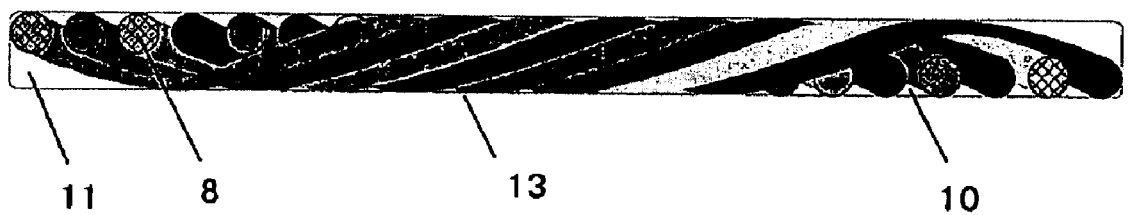
FIG. 4 is a schematic diagram illustrating the structure of the electroluminescent cable according to a second embodiment the present invention.

Embodiment 2:

As shown in FIG. 4, a color-changing and multi-colored electroluminescent cable without axis, comprising:

a group of electroluminescent filaments 10 consisting of a plurality of electroluminescent filaments 8 of different colors which are insulated from each other and helically wrung together in the same direction;

a transparent polymer casing tube 11 disposed on an outer side of the group of electroluminescent filaments 10 to form a flexible light emitting cable 13;

wherein each filament 8 of the group of electroluminescent filaments 10 is connect with the programmable electronic elements respectively, and said programmable electronic elements control each electroluminescent filament 8 respectively to emit light according to a predetermined program.

After AC power supply having a voltage ranging from 50 to 300 V and frequency ranging from 200 to 10000 HZ is input, under the control of programmable electronic elements, an electric field is generated between the electrodes of electroluminescent filament. When the filaments are activated, the light of different colors will emit. So the electroluminescent cable becomes beautiful and colorful. Furthermore, the color, saturation, luminance and other aspects are controllable. Through the control of the programmable electronic elements, each filament of the cable will emit light in sequence such that the light-emitting cable can be formed with changeable colors and brightness.

Said group of electroluminescent filaments 10 consists of at least 2 to 8 electroluminescent filaments 8.

The diameter of said each electroluminescent filament 8 is 0.5–3 mm.

The diameter of said flexible light emitting cable 13 is 2–20 mm.

INDUSTRIAL APPLICABILITY

The electroluminescent filament of the present invention is low in power consumption, free from heating and cannot be abnormally switched off, and has relatively long service life, with 4000-hour lighting time. The filament can be bent into a plurality of geometrical shapes as consumers demand, and it is beautiful and appealing, with a plurality of colors to choose from. Besides, being extraordinarily extensive in its scope of application, the present invention can be used for external and internal housing and automobile decoration, and for external decoration for the purpose of advertisement, in entertainment places, and for toys, art and handicraft products and electric and electronic equipment.

We claim:

1. A color-changing and multi-colored electroluminescent cable, comprising:
   a core wire made of soft metal or polymer as the central axis;
   a group of electroluminescent filaments consisting of a plurality of electroluminescent filaments of different colors which are insulated from each other and helically wound on the outer side of the axis;
   a transparent and flexible polymer casing tube disposed on an outer side of the group of electroluminescent filaments to form a flexible light emitting cable; and
   wherein each electroluminescent filament of said plurality of electroluminescent filaments of said group of electroluminescent filaments comprises:
   a metal conductive wire as a core wire and a first electrode;
   a medium insulating layer, which is made of an insulating mixture with improved density, coated on the core wire;
   a light emitting layer, which is made of a light-emitting mixture with improved density, coated on the medium insulating layer;
   a conductive layer, which is made of a semi-transparent, semi-solid viscous conductive polymer containing Au and methyl methacrylate, coated on the light emitting layer;
   one or more transmission conductive wires wound at interval on the conductive layer and led out as a second electrode;
   a color polymer casing tube disposed on the transmission conductive wires and the conductive layer.

2. The electroluminescent cable according to claim 1, wherein each filament of the group of electroluminescent filaments is separately connected with a programmable electronic element, and said programmable electronic element individually controls each electroluminescent filament to emit light according to a predetermined program.

3. The electroluminescent cable according to claim 1, wherein an AC power supply of said group of electroluminescent filament has a voltage ranging from 50 to 300 V and frequency ranging from 200 to 10000 HZ.

4. The electroluminescent cable according to claim 1, wherein said group of electroluminescent filaments consists of at least 2 to 8 electroluminescent filaments.

5. The electroluminescent cable according to claim 1, wherein the diameter of said central axis is 0.5–10 mm.

6. The electroluminescent cable according to claim 1, wherein the diameter of said each electroluminescent filament is 0.5–3 mm.

7. The electroluminescent cable according to claim 1, wherein the diameter of said flexible light emitting cable is 2–20 mm.

8. The electroluminescent cable according to claim 1, wherein said core wire is a metal wire of a diameter 0.1–1 mm and is led out as the first electrode.

9. The electroluminescent cable according to claim 1, wherein said medium insulating layer is a mixture coat of a flexible binder having cyanoethyl as its base and $BaTiO_3$ powder, with a thickness of 25–60 $\mu$m.

10. The electroluminescent cable according to claim 1, wherein said light-emitting layer is a mixture coat of a flexible binder having cyanoethyl as its base and light emitting phosphorus powder, with a thickness of 25–60 $\mu$m.

11. The electroluminescent cable according to claim 1, wherein said conductive layer has a thickness of 0.05 mm or less.

12. The electroluminescent cable according to claim 1, wherein said transmission conductive wires have one or more metal conductive wires that are highly conductive, specially treated and not easy to break; said metal conductive wires winds, at interval, round the outer side of the conductive layer and are led out as the second electrode.

13. The electroluminescent cable according to claim 1, wherein the diameter of said transmission conductive wires is 0.04–0.12 mm.

14. A color-changing and multi-colored electroluminescent cable without axis, comprising:
   a group of electroluminescent filaments consisting of a plurality of electroluminescent filaments of different colors which are insulated from each other and helically wrung together in the same direction;
   a transparent and flexible polymer casing tube disposed on an outer side of the group of electroluminescent filaments to form a flexible light emitting cable; and
   wherein each electroluminescent filament of said plurality of electroluminescent filaments of said group of electroluminescent filaments comprises:
   metal conductive wire as a core wire and a first electrode;
   a medium insulating layer, which is made of an insulating mixture with improved density, coated on the core wire;
   a light emitting layer, which is made of a light-emitting mixture with improved density, coated on the medium insulating layer;
   a conductive layer, which is made of a semi-transparent, semi-solid viscous conductive polymer containing Au and methyl methacrylate, coated on the light emitting layer;
   one or more transmission conductive wires wound at interval on the conductive layer and led out as a second electrode;
   a color polymer casing tube disposed on the transmission conductive wires and an outer surface of conductive layer.

15. The electroluminescent cable according to claim 14, wherein each filament of the group of electroluminescent filaments is connected with a programmable electronic element, and said programmable electronic element individually controls each electroluminescent filament to emit light according to a predetermined program.

16. The electroluminescent cable according to claim 14, wherein an AC power supply of said group of electroluminescent filament has a voltage ranging from 50 to 300 V and frequency ranging from 200 to 10000 HZ.

17. The electroluminescent cable according to claim 14, wherein said group of electroluminescent filaments consists of at least 2 to 8 electroluminescent filaments.

18. The electroluminescent cable according to claim 14, wherein the diameter of said each electroluminescent filament is 0.5–3 mm.

19. The electroluminescent cable according to claim 14, wherein said core wire is a metal wire of a diameter 0.1–1 mm and is led out as the first electrode.

20. The electroluminescent cable according to claim 14, wherein said medium insulating layer is a mixture coat of a flexible binder having cyanoethyl as its base and $BaTiO_3$ powder, with a thickness of 25–60 $\mu$m.

21. The electroluminescent cable according to claim 14, wherein said light-emitting layer is a mixture coat of a flexible binder having cyanoethyl as its base and light emitting phosphorus powder, with a thickness of 25–60 $\mu$m.

* * * * *